United States Patent [19]

Yeh

[11] Patent Number: 5,714,255
[45] Date of Patent: Feb. 3, 1998

[54] PHOSPHORESCENT DIRECTIONAL SIGNALS AND MANUFACTURING METHOD

[75] Inventor: Ling Yeh, Anderson, S.C.

[73] Assignee: BASF Corporation, Mt. Olive, N.J.

[21] Appl. No.: 680,117

[22] Filed: Jul. 15, 1996

Related U.S. Application Data

[62] Division of Ser. No. 33,990, Mar. 19, 1993, Pat. No. 5,605,734, which is a continuation of Ser. No. 725,959, Jun. 28, 1991, abandoned, which is a continuation of Ser. No. 430,763, Nov. 2, 1989, abandoned.

[51] Int. Cl.$^6$ .................... D02G 3/00; B32B 9/00
[52] U.S. Cl. .................... 428/364; 428/85; 428/89; 428/97; 428/359; 428/690; 428/913
[58] Field of Search .................... 428/85, 89, 97, 428/359, 364, 690, 913

[56] References Cited

U.S. PATENT DOCUMENTS

| | | |
|---|---|---|
| 2,169,657 | 8/1939 | Millson . |
| 2,838,762 | 6/1958 | Wodely . |
| 2,968,856 | 1/1961 | Allen . |
| 3,688,804 | 9/1972 | Brown et al. . |
| 4,623,579 | 11/1986 | Quon ........................ 428/215 |
| 4,781,647 | 11/1988 | Doane, Jr. . |
| 4,943,896 | 7/1990 | Johnson . |
| 5,321,069 | 6/1994 | Owens . |

OTHER PUBLICATIONS

Translation of EPO 0,173,762 to Kollmer et al.; "Phosphorescent Flock Coated Substrate and Process and Equipment for its Production", Mar. 12, 1986.

Primary Examiner—Terrel Morris
Attorney, Agent, or Firm—Nixon & Vanderhye

[57] ABSTRACT

Claimed are a method of making a direction indicating carpet, useful in temporarily unlighted building hallways and rooms. Symbols are tufted into the carpet using zinc sulfide copper activated pigments in concentration of 2% in the fiber.

5 Claims, 1 Drawing Sheet

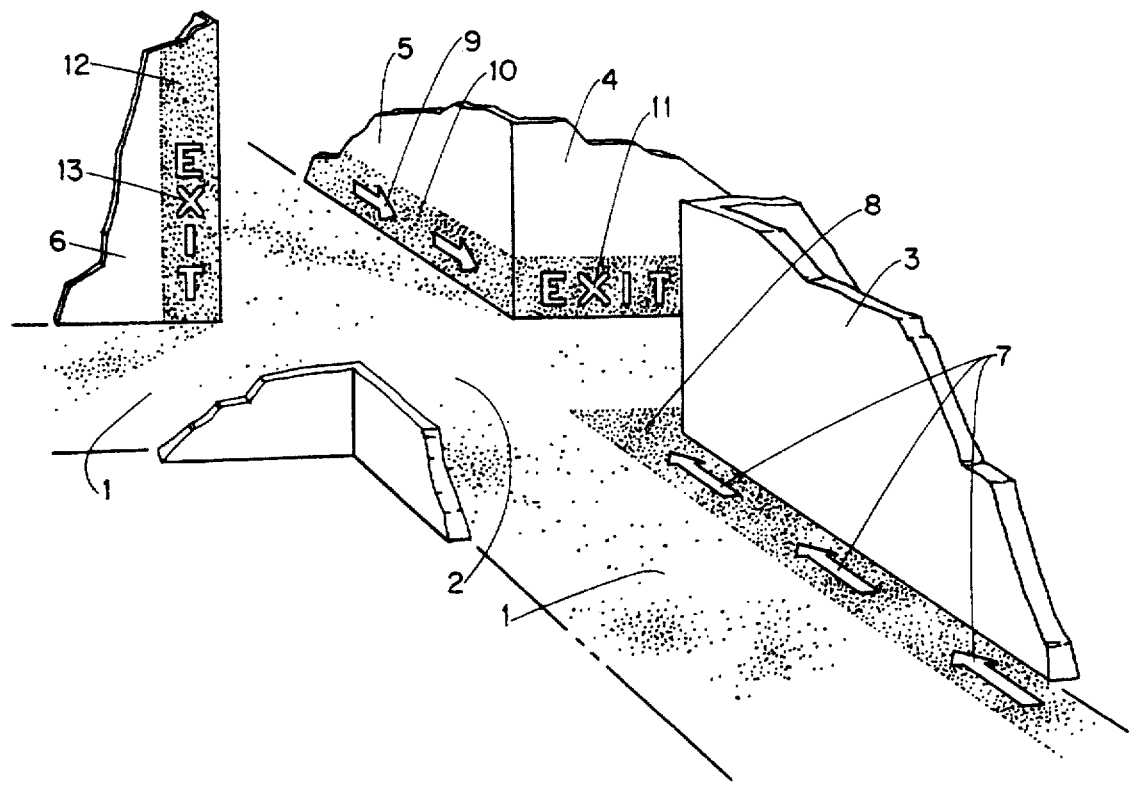
FIGURE

PHOSPHORESCENT DIRECTIONAL SIGNALS AND MANUFACTURING METHOD

This is a divisional of application Ser. No. 08/033,990, filed Mar. 19, 1993, now U.S. Pat. No. 5,605,734 which in turn is a continuation of application Ser. No. 07/725,959 filed Jun. 28, 1991 (now abandoned), which in turn is a continuation of Ser. No. 07/430,763 filed Nov. 2, 1989 (now abandoned).

BACKGROUND OF THE INVENTION

It is known in, e.g., U.S. Pat. No. 4,708,817 to form artistic expressions having a latent luminescent image pattern. U.S. Pat. No. 4,413,588 describes an animal restraint collar formed of luminous or light reflective plastic material. Other patents, U.S. Pat. Nos. 4,052,610 and 4,003,507, describe luminous flashlight assemblies and holsters.

Public buildings and private buildings having high traffic patterns at all times of the day have various devices for indicating exits and traffic directions for normal times and in the event of emergencies and/or power failures. It is common, for example, to find a series of charged lights in hallways and stairwells that automatically come on in the event of an emergency or failure of electrical power to the existing system.

BRIEF DESCRIPTION OF THE PRESENT INVENTION

The present invention makes use of luminous pigments in carpeting and similar materials to form directional symbols or signs indicating traffic patterns to exits. The symbols or signs are formed in the carpeting during the manufacturing process and may or may not be, as desired, visible in natural light conditions.

The invention also comprises particular luminescent pigments found to satisfactorily withstand carpet manufacture. Phosphorescent zinc sulfide copper activated pigments belonging to the inorganic sulfides family have given satisfactory results.

BRIEF DESCRIPTION OF THE ACCOMPANYING DRAWINGS

The accompanying drawing FIGURE depicts various embodiments of the present invention in a hallway installation.

DETAILED DESCRIPTION OF THE INVENTION

Carpeting is referred to herein as a product of manufacture used for flooring or walls, usually comprising a backing material such as jute, in which filaments or fibers are looped or knitted. An adhesive may be used to bind the filaments or fibers to the backing material. The upper surface of the filaments or fibers may be subjected to further treatment, such as shearing or clipping or may be left in full looped condition, as desired.

Methods for manufacturing carpeting are well known. See, e.g., U.S. Pat. No. 3,024,518 and U.S. Pat. No. 3,842,767. U.S. Pat. No. 4,107,361 teaches the manufacturing of a grass-like carpet, also considered within this invention.

Addition of pigments and other ingredients into a polymeric means to be spun into fiber is also well known. U.S. Pat. No. 4,192,794 adds titanium dioxide pigment and a zinc salt to a polyolefin for improved visibility and stability. U.S. Pat. No. 3,205,202 also adds $TiO_2$ to synthetic polymers for "brightening" the polymer. Thermoplastic nylon materials are stabilized with copper compounds disclosed in U.S. Pat. No. 4,172,069.

In making the present invention, carpet fibers are manufactured having added therein phosphorescent pigments, specifically, zinc sulfide copper activated pigments. Two pigments that have been shown to successfully pass through fiber and carpet manufacture are United Mineral and Chemical pigments 655U and 100A.

The amount of pigment added to the polymer compound must be sufficient to emit enough energy to be visible in an unlighted state, but interfere with fiber spinning as little as possible. Of the pigments referred to, the addition of 2–10% appeared the satisfactory range to permit visibility but also perform well in polymer melt spinning operations. The yarn of this invention may be processed through a drawtexturing technique similar to those found in, e.g., U.S. Letters Pat. No. 4,100,659.

EXAMPLE

In the following samples, nylon 6 polymer containing luminescent additives were spun under the following conditions:

| | |
|---|---|
| Polymer Spinning Temperature | 265° C. |
| Extruder Pressure | 1,000 PSIG |
| Throughput | 30 grams/min. |
| Spinneret | 14 hole |
| Take-up Speed | 372 mpm |

In determining the effectiveness of the additives, samples of yarn containing the additives were tufted into a 2" band in carpet construction. The carpet samples were placed in a room of about 12'×15' having a small window in the single door to the room. The samples were placed about 6 feet from the observer on a table separated from each other sufficiently to be distinguishable. Samples were marked for identification on the undersides. With the lights in the room off, enough light from outside the room was emitted by the small door window to make features in the room visible but hardly distinguishable.

The observers of the carpeting samples graded the phosphorescent quality of the samples as not visible, visible, adequate, and good. The sample graded visible could be seen in the semi-darkened room as clearly as the adequate and good samples only from a close view. The adequate and good samples could be seen clearly from 6 feet and further in the semi-darkened room.

TABLE

ADDITIVE LEVEL

| Sample | % Pigment | Pigment Type | Phosphorescence |
|---|---|---|---|
| 1 | — | — | None |
| 2 | 2% | 100A | Adequate |
| 3 | 5% | 100A | Good |
| 4 | 2% | 655U | Visible |
| 5 | 5% | 655U | Adequate |

The addition of dyes or other colorants to the luminescent pigmented fiber detracts from the visibility of the fiber in darkened state. It is therefore more preferable to use the fiber in its natural state or with only slight transparent dyeing. Further, because of the light or no dye treatment, the thus pigmented fiber should best be placed in an area of the carpet having less traffic. For example, the pigmented fibers can be formed in luminescent symbols placed in the 6"–12" space nearest a hallway wall, or on the wall itself. The symbols may be placed on the wall by extending, e.g., the carpeting part way up the wall.

The symbols may be in the form of arrows, darts, wording, and other directional indicia, and can be formed in the appropriate part of the carpet by directing, e.g., in the '767 patent, the pigmented yarns into the backing material 13 in the form of tufts, the tuft pattern of the pigmented yarn forming the appropriate symbol and conventional color pigmented yarns forming the remainder of the material to be tufted. The tufting pattern may be customized for a particular location or may be one that repeats for general use.

The FIGURE represents embodiments of the invention in a hallway installation. Hallway 1 represents, e.g., a hotel hallway carpeting at an intersection 2. Walls 3, 4, 5, and 6 depict walls of the intersection.

Alongside wall 3 in the floor carpeting area 8 are carpet sections 7 comprised of fibers of this invention. These sections, in the form of arrows, point toward exits from the area in the event of power failure, the phosphorescent pigments direct hall occupants toward an exit area.

Similarly, fibers of the invention in segments 9 of a wall covering 10 on wall 5 luminesce in blackout conditions, pointing the way toward an exit. Segments 11 and 13 formed in wall covering 10 and 12 of walls 5 and 6, respectively, are in the form of letters identifying an exit.

What is claimed is:

1. A phosphorescent fiber comprising:

(a) a fiber forming polymer; and (b) about 2 to about 10% by weight, based on the total weight of the fiber, of a phosphorescent pigment homogeneously distributed therein.

2. The fiber according to claim 1, wherein the fiber forming polymer is selected form the group consisting of a polyamide, a polyester and a polyolefin.

3. The fiber according to claim 2, wherein the polyamide is nylon 6.

4. The fiber according to claim 1, wherein the phosphorescent pigment comprises zinc sulfide copper activated pigments.

5. The fiber according to claim 4, comprising nylon 6 as component (a) and from about 2 to about 10% by weight, based on the total weight of the fiber, of the zinc sulfide copper activated pigment.

* * * * *